No. 730,687. PATENTED JUNE 9, 1903.
S. OTIS.
TRUCK FOR CARS OR OTHER VEHICLES.
APPLICATION FILED SEPT. 29, 1902.
NO MODEL. 2 SHEETS—SHEET 1.
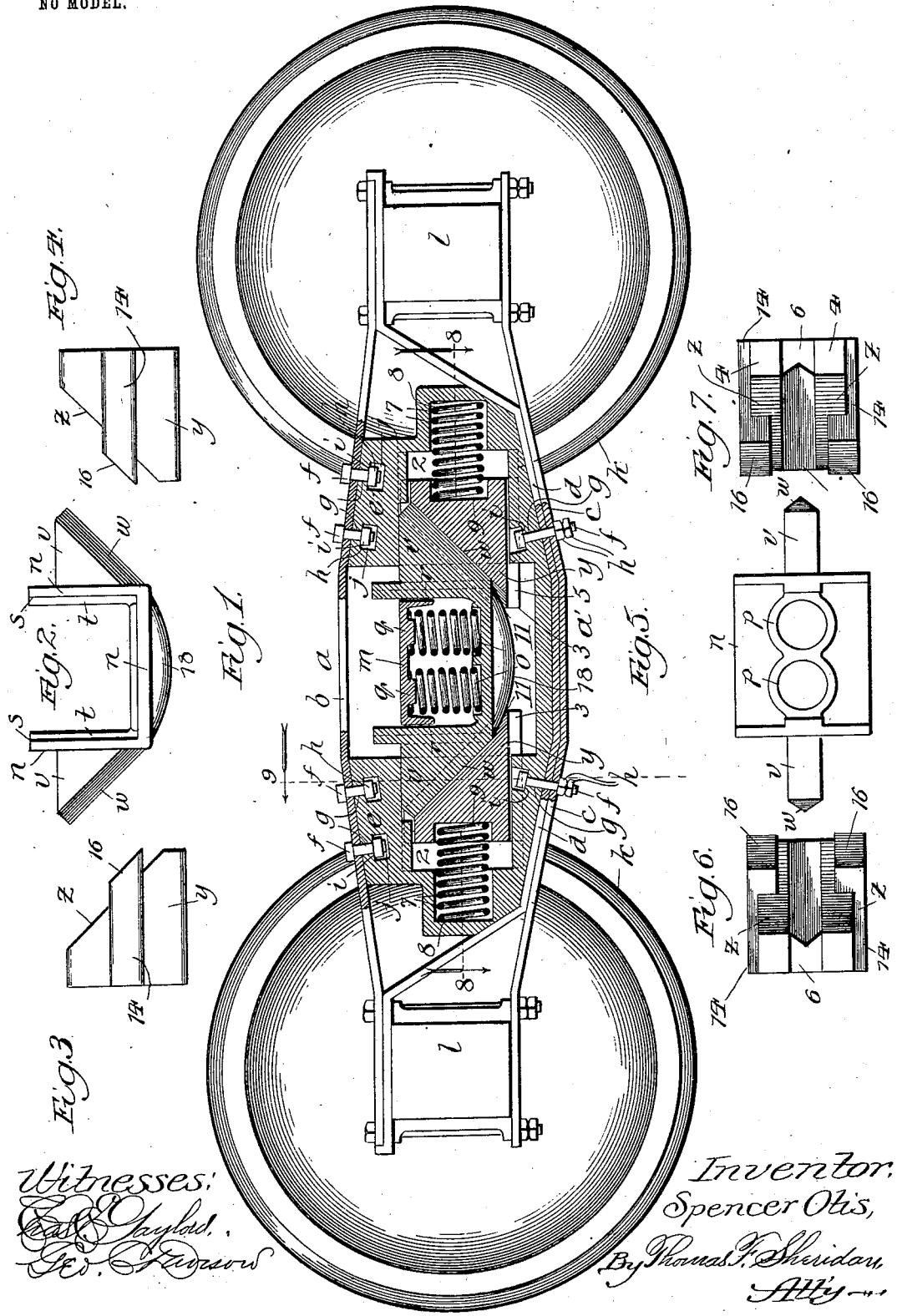

No. 730,687. PATENTED JUNE 9, 1903.
S. OTIS.
TRUCK FOR CARS OR OTHER VEHICLES.
APPLICATION FILED SEPT. 29, 1902.
NO MODEL. 2 SHEETS—SHEET 2.
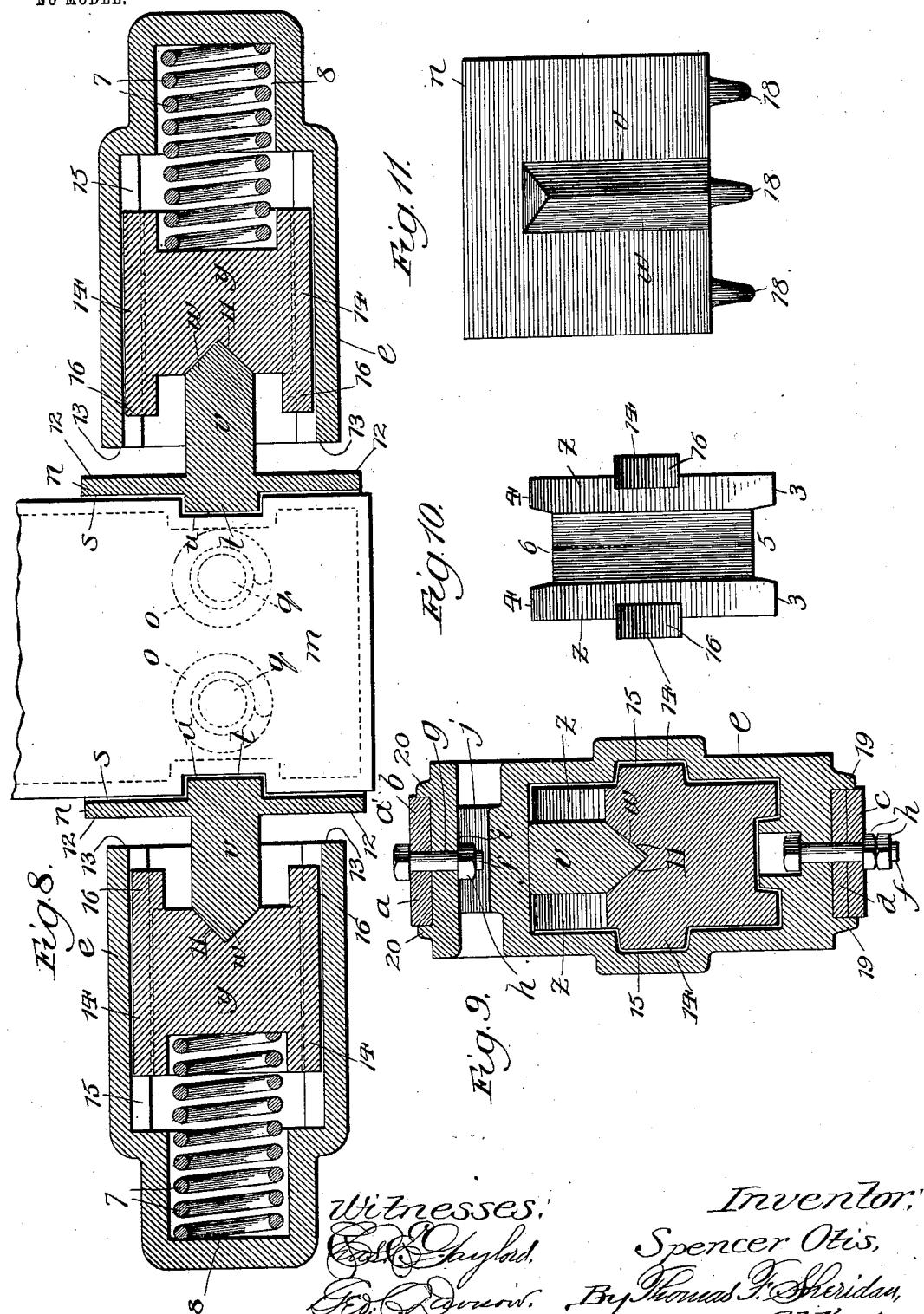

No. 730,687.　　　　　　　　　　　　　　　　　　　　　　　　Patented June 9, 1903.

UNITED STATES PATENT OFFICE.

SPENCER OTIS, OF CHICAGO, ILLINOIS, ASSIGNOR TO NATIONAL PATENT HOLDING COMPANY, OF RAPID CITY, SOUTH DAKOTA, AND CHICAGO, ILLINOIS, A CORPORATION OF SOUTH DAKOTA.

TRUCK FOR CARS OR OTHER VEHICLES.

SPECIFICATION forming part of Letters Patent No. 730,687, dated June 9, 1903.

Application filed September 29, 1902. Serial No. 125,297. (No model.)

*To all whom it may concern:*

Be it known that I, SPENCER OTIS, a citizen of the United States, residing at Chicago, in the county of Cook and State of Illinois, have invented certain new and useful Improvements in Trucks for Cars or other Vehicles, of which the following is a specification.

My invention relates to that class of trucks for vehicles having truck-frames or gear-frames, a bolster or similar element mounted in such frames, and instrumentalities for supporting the bolster and forming a yielding connection between it and the truck-frames or gear-frames.

It relates particularly to the means for yieldingly supporting the bolster or similar element in the truck-frames.

The principal object of my invention is to provide a simple, economical, and efficient truck for vehicles.

A further object of the invention is to provide a truck for vehicles having truck-frames and a bolster or similar element mounted in such frames in yielding connection therewith, so as to permit the bolster to move a limited distance in any direction with relation to the truck-frames.

A further object is to provide a truck having a bolster or similar element for supporting the body of the vehicle adapted to move in any direction with relation to such truck and provided with means for yieldingly resisting and positively limiting the movement of the vehicle-body-supporting element and vehicle-body downwardly, longitudinally, and transversely, so as to provide a cushioning resistance to the weight of the vehicle-body in whatever direction it may move, whether downward, longitudinally, or sidewise of the vehicle.

A further object is to provide a vehicle-truck having side frames, a bolster or similar element having its ends mounted within such side frames and provided with friction mechanism for supporting such bolster in the side frames and providing a yielding frictional cushioning resistance to its movements in all directions, horizontally as well as downward.

A further object is to provide a vehicle-truck having side frames, a bolster-supporting friction-plate for each end of the bolster removable with relation thereto, means for yieldingly supporting the bolster in such supporting friction-plates, and means for yieldingly supporting the supporting friction-plates, and thereby the bolster.

A further object of the invention is to provide a vehicle-truck with mechanism adapted to sustain the body of the vehicle, and thereby the weight of the load, and change the force of the downward movements thereof to a substantially horizontal direction, such mechanism comprising cushioning mechanism adapted to resist the downward movement of the vehicle-body and yield in a substantially horizontal direction to such downward movement and yieldingly resist or cushion the movements of the vehicle-body in all substantially horizontal or downward directions.

A further object of my invention is to provide a car-truck having side frames, a bolster mounted within such frames, spring mechanism arranged beneath the ends of the bolster, and means for yieldingly supporting the bolster when such spring mechanism has reached its limit of compression, permitting the bolster to have limited perpendicular, longitudinal, and transverse play and providing a yielding resistance against the longitudinal thrusts and downward and transverse movements thereof.

A further object of the invention is to provide a vehicle-truck having side frames, a bolster having its ends mounted within such frames, and instrumentalities arranged substantially at the sides of the bolster for yieldingly supporting it and forming a yielding connection between it and the side frames, and providing a yielding cushioning resistance to its movements in all directions, horizontally and downward.

Other and further objects of the invention will appear from an inspection of the drawings and the following description and claims.

The invention consists in the features, combinations, and details of construction hereinafter described and claimed.

In illustrating and describing my invention

I have herein shown it as applied to a railway-car, though it may be applied to other vehicles.

In the accompanying drawings, Figure 1 is a view in elevation and partly in section of a car-truck constructed in accordance with my improvements; Fig. 2, a detail view in elevation of one of the supporting spring-plates; Fig. 3, a detail view in elevation of a sliding friction-block; Fig. 4, a detail view in elevation of a second sliding friction-block; Fig. 5, a plan view of the main bolster-supporting spring-plate shown in Fig. 2; Fig. 6, a plan view of the sliding friction-block shown in Fig. 3; Fig. 7, a plan view of the sliding friction-block shown in Fig. 4; Fig. 8, a sectional plan view of the truck-frame, taken on line 8 of Fig. 1 looking in the direction of the arrow; Fig. 9, a sectional view in elevation of the truck-frame, taken on line 9 of Fig. 1 looking in the direction of the arrow; Fig. 10, a view in elevation of a sliding friction-block, and Fig. 11 a side elevation of one of the main supporting spring-plates.

In constructing a vehicle-truck in accordance with my improvements I provide a truck-frame $a$, having side frames $a'$, each comprising an upper arch-bar $b$, lower truss-bar $c$, intermediate truss-bar $d$, bolster-columns $e\,e$, held in position between the upper and lower bars of the frame by means of bolts $f$, extending through perforations $g$ in the bolster-columns and provided with nuts $h$, resting against shoulders $i$, formed by recesses $j$ in such bolster-column, which recesses are adapted to receive the nut or bolt-head. The bolster-columns are provided with downwardly-projecting side flanges 19 and upwardly-projecting side flanges 20, adapted to engage the upper and lower bars of the side frames. The side frames thus formed may each be made in one integral casting, if desired, and may be joined together in any desired and well-known manner, as by means of cross-ties. (Not shown.) They are mounted upon journals (not shown) of the truck-wheels $k$ in suitable bearings in the boxes $l$ in any ordinary and well-known manner. A bolster $m$ is then provided and mounted in a truck-frame or pair of side frames, as shown in Figs. 1 and 8.

It will of course be understood that two frames such as the one above described constitute a pair and are comprised in what I would term a "complete" truck-frame and that only one of the side frames and one end of the bolster with its connections is shown, for the reason that the opposite side frame, bolster end, and connections are identical and need not, therefore, be further described.

In order to provide means for yieldingly supporting a bolster or similar vehicle-body-supporting element, so as to permit it to have the desired perpendicular, longitudinal, and transverse play and provide the desired yielding resistance to the end thrust and downward and transverse movements thereof due to the shifting of the center of gravity when the vehicle is in motion and also to change the direction of the force from a downward to a substantially horizontal direction, thus economizing the space beneath the bolster or similar support, main bolster-supporting spring friction-plates $n$ are provided, one for each end of the bolster, and mounted, respectively, in the side frames, as shown in Figs. 1 and 8. To yieldingly support the ends of the bolster in such supporting friction-plates, spiral springs $o$ are provided and mounted between the bolster and supporting friction-plates, the lower ends being preferably arranged in recesses $p$ of the supporting-plate and the upper ends held in position by projecting lugs $q$ upon the lower side of the bolster, which is also provided with downwardly-extending side flanges $r$, which provide the desired extent of flat surface in sliding contact with the supporting spring friction-plates. To hold the bolster and supporting-plates in substantially fixed relation to each other with reference to their movements in a direction longitudinal of the bolster and permit the vertical movements thereof, either independently or together, the supporting spring friction-plates are hollowed out and provided with perpendicular walls $s$, adapted to receive the ends of the bolster in sliding contact therewith and prevent the sidewise movement thereof with reference to the supporting-plate, such inner walls being provided with inwardly-projecting guide-lugs $t$, adapted to enter perpendicular slots $u$ in the bolster and in sliding contact therewith. By this arrangement a yielding connection is formed between the bolster and main supporting spring friction-plates and the parts are held in the desired substantially fixed relation to each other with reference to the longitudinal movements of the bolster.

It is also desirable that means be provided whereby the bolster may have a yielding support independent of the yielding quality of the springs $o$ and adapted to yieldingly support it even when the springs arranged beneath the ends thereof have reached their limit of compression and permit the farther downward movement of the bolster. This is particularly desirable in view of the necessity for economizing the space above and below the ends of the bolster and in view of the importance of having a bolster-frame of such compactness as to occupy the least possible amount of space above and below the bolster consistent with the greatest possible extent of perpendicular play and cushioning resistance to its perpendicular play. In order to accomplish these purposes and provide these advantages, the supporting friction-plates are each provided with projecting tongues $v$, extending outward from the walls thereof in opposite directions and having their lower edges $w$ extending downwardly and inwardly at an angle, so as to form a substantially wedge-shaped friction-base portion. Sliding friction-blocks $y$ are then provided, having upper inclined surfaces $z$, having grooves 11 in sliding frictional engagement with the lower inclined surfaces $w$ of the supporting spring-plates.

These friction-blocks are slidably mounted in recesses 2 in the bolster-columns or fixed spring-seats, which, as above described, constitute a part of the side frame of the truck and are provided with downwardly-projecting side flanges 3 and upwardly-projecting side flanges 4, forming slots 5 and 6 for holding the sliding friction-blocks in position and in sliding contact with the bolster-columns or truck-frame. To form the desired yielding resistance to the movement of these sliding friction-blocks in a direction away from the bolster and at an angle with the perpendicular center thereof, spiral springs 7 are provided and mounted in the frame or bolster-column in recesses 8, formed for the reception of one end of such springs, and the opposite ends thereof are arranged in recesses 9 in the respective sliding friction-blocks, so that when the weight upon the bolster presses the main bolster-supporting plates downward the sliding friction-blocks move in opposite directions against the springs 7 and afford a yielding resistance to the downward movement of the bolster.

It is further desirable that means be provided for permitting the necessary longitudinal movement or end thrust of the bolster in the side frames, limiting such longitudinal movements and providing the desired cushioning or yielding resistance thereto. To accomplish these objects, the downwardly and inwardly extending faces $w$ of the projecting tongue portions are made convex and substantially V-shaped in horizontal cross-section, and the adjacent inclined edges $z$ of the sliding friction-blocks are made concave, as at 11, and substantially V-shaped, so as to conform to and slidingly contact with the convex lower edges of the main supporting-plate. The outer faces 12 of the walls $n$ are made, preferably, perpendicular and parallel with the sides of the bolster and arranged a sufficient distance from the inner walls 13 of the bolster-column or frame to permit the desired transverse movement of the bolster and the supporting spring-seat within the bolster-column or frame. By this arrangement when the bolster, with the main supporting spring-plates, moves longitudinally or transversely in either direction the convex portions of the projecting tongues of the supporting-plate will contact with the concave surfaces of the sliding friction-blocks, which being backed by the springs 7, as above described, afford the desired yielding resistance to the longitudinal movement of the bolster in either direction and afford a cushioning or yielding resistance to the transverse movement thereof within the bolster-column or frame.

To positively limit the longitudinal movement of the bolster and main supporting-plates and complete the sliding connection between the sliding friction-blocks and the bolster-columns or frame in which they are mounted, the sliding friction-blocks may be provided with projecting guide-lugs 14, mounted slidably in recesses 15 in the bolster-columns, and such lugs may have projecting end portions 16, adapted to contact with the sides of the main supporting-plate tongues, and the bolster may be provided with lugs (not shown) between the side frames and adapted to contact them and limit the end thrust. To limit the downward movement of the main supporting-plates, the projecting tongues thereof are of such dimensions with relation to the recesses in the transom-column as to contact with the upper surface 17 thereof when the supporting-plate has reached the desired limit of movement upwardly, and the perpendicular walls of the main supporting-plate may extend upwardly beyond the top of the projecting tongues, as shown in Figs. 1 and 2. This construction may without departing from my invention be varied by the removal of the intervening wall of the supporting-plate from between the bolster and the edges of the side frame.

In order to provide the necessary strength and at the same time afford the desired compactness, economy of material, and lightness of construction, the main supporting spring-plate is provided with reinforcing-flanges 18.

I claim—

1. In a vehicle-truck of the class described, the combination of a truck-frame provided with downwardly-movable mechanism for yieldingly supporting the vehicle-body, substantially horizontally movable friction mechanism mounted in frictional engagement with such supporting mechanism, and spring mechanism in engagement with such substantially horizontally movable friction mechanism, substantially as described.

2. In a vehicle-truck of the class described, the combination of a truck-frame provided with means for supporting the body of the vehicle, and substantially horizontally movable friction mechanism adapted to provide a frictional and substantially horizontal cushioning resistance to the downward movements of the vehicle-body, substantially as described.

3. In a vehicle-truck of the class described, the combination of a pair of side frames, a bolster mounted in such side frames, and mechamism yieldingly mounted intermediate the bolster and the side frames and movable at an angle from the perpendicular center of the bolster in a substantially horizontal direction for supporting such bolster, substantially as described.

4. In a vehicle-truck of the class described, the combination of a pair of side frames, a bolster mounted in such frames, mechanism yieldingly mounted at each side of the bolster and movable at an angle from the perpendicular center of the bolster in a substantially horizontal direction for supporting such bolster, and spring mechanism arranged intermediate such movable bolster-supporting mechanism and the side frames, substantially as described.

5. In a vehicle-truck of the class described, the combination of a pair of side frames, a bolster mounted in such side frames, and horizontally-movable friction-blocks slidingly mounted in the side frames for yieldingly supporting and cushioning the bolster, substantially as described.

6. In a vehicle-truck of the class described, the combination of a pair of side frames, a bolster mounted in such side frames and provided with supporting friction mechanism arranged at each end thereof, sliding friction-blocks arranged in engagement with such friction mechanism, and spring mechanism in engagement with such sliding blocks, substantially as described.

7. In a vehicle-truck of the class described, the combination of a pair of side frames, a bolster mounted in such side-frames, a main bolster-supporting friction-plate for each end of the bolster, spring mechanism arranged intermediate the bolster and such main bolster-supporting friction-plates, friction-blocks slidably mounted in the side frames and in frictional engagement with the main bolster-supporting friction-plates, and spring mechanism in engagement with such sliding friction-blocks, substantially as described.

8. In a vehicle-truck of the class described, the combination of a pair of side frames, a bolster mounted in such side frames, a bolster-supporting friction-plate mounted at each end of such bolster, spring mechanism arranged intermediate the bolster and such supporting friction-plates, friction-blocks in frictional engagement with such friction-plates and slidingly mounted in the side frames and movable in a substantially horizontal direction, and spring mechanism in engagement with such sliding friction-blocks for permitting and providing a yielding resistance to the movements thereof, substantially as described.

9. In a vehicle-truck of the class described, the combination of a pair of side frames, a bolster mounted in such side frames, bolster-supporting friction-plates for each end of the bolster, sliding friction-blocks arranged in frictional engagement with the bolster-supporting friction-plates and movable at an angle to the movements of such bolster-supporting friction-plates, and spring mechanism in engagement with the sliding friction-blocks for holding them yieldingly in frictional engagement with the friction-plates, substantially as described.

10. In a vehicle-truck of the class described, the combination of a pair of side frames, a bolster mounted in such side frames, a bolster-supporting friction-plate for each end of such bolster, spring mechanism arranged intermediate the bolster and bolster-supporting friction-plates, and friction mechanism in frictional engagement with such bolster-supporting friction-plates, substantially as described.

11. In a vehicle-truck of the class described, the combination of a pair of side frames, a bolster mounted in such side frames and provided with friction mechanism, friction-blocks arranged in frictional engagement with such friction mechanism and movable at an angle thereto, and spring mechanism for holding such friction-blocks yieldingly in frictional engagement with such friction mechanism, substantially as described.

12. In a vehicle-truck of the class described, the combination of a pair of side frames, a bolster mounted in such side frames, bolster-supporting friction-plates arranged at each end of such bolster having lower friction-surfaces extending downwardly and inwardly at an angle, friction-blocks provided with upper friction-surfaces arranged adjacent to the lower friction-surfaces of the bolster-supporting friction-plates such friction-blocks being mounted movably in a substantially horizontal direction, and spring mechanim in engagement with such friction-blocks for yieldingly holding them in frictional engagement with the bolster-supporting friction-plates, substantially as described.

13. In a vehicle-truck of the class described, the combination of a pair of side frames, a bolster mounted in such side frames and provided with friction-plates at each end thereof, integral transversely-extending tongues for such friction-plates provided with downwardly and inwardly extending inclined friction-surfaces, friction-blocks arranged in frictional engagement with the tongue portions of such friction-plates, means for yieldingly holding such friction-blocks in operative position, and means for positively limiting the movements of the bolster, substantially as described.

14. In a vehicle-truck of the class described, the combination of a pair of side frames, comprising upper arched bars, lower and intermediate truss-bars and bolster-columns, a bolster mounted within such frames between the bolster-columns and provided with friction mechanism, friction-blocks slidingly mounted in the bolster-columns and in frictional engagement with the friction mechanism of the bolster, spring mechanism in engagement with the sliding blocks for holding them in frictional engagement with the friction mechanism of the bolster, and means for positively limiting the movements of the bolster and friction mechanism, substantially as described.

15. In a vehicle-truck of the class described, the combination of a truck-frame, a bolster mounted therein, a bolster-supporting friction-plate for each end of the bolster removably mounted in relation thereto, and friction-blocks mounted in frictional engagement with the bolster-supporting friction-plates, intermediate such plates and the truck-frame in sliding engagement with such truck-frame, substantially as described.

SPENCER OTIS.

Witnesses:
ANNIE C. COURTENAY,
A. L. SAVOIE.